(12) United States Patent
Shen et al.

(10) Patent No.: US 11,894,638 B2
(45) Date of Patent: Feb. 6, 2024

(54) SOLID STATE PROTECTIVE SMART PLUG DEVICE

(71) Applicants: Zheng Shen, Chicago, IL (US); Zhixi Deng, Chicago, IL (US); Yuanfeng Zhou, Chicago, IL (US)

(72) Inventors: Zheng Shen, Chicago, IL (US); Zhixi Deng, Chicago, IL (US); Yuanfeng Zhou, Chicago, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 170 days.

(21) Appl. No.: 17/386,051

(22) Filed: Jul. 27, 2021

(65) Prior Publication Data
US 2022/0029362 A1  Jan. 27, 2022

Related U.S. Application Data
(60) Provisional application No. 63/057,107, filed on Jul. 27, 2020.

(51) Int. Cl.
*H01R 13/66* (2006.01)
*H02H 3/10* (2006.01)

(52) U.S. Cl.
CPC .......... *H01R 13/6683* (2013.01); *H02H 3/10* (2013.01)

(58) Field of Classification Search
CPC ............... G01R 22/063; G05B 19/042; G05B 2219/25448; G05B 2219/2642; H01R 13/665; H01R 13/6666; H01R 13/6675; H01R 13/6683; H01R 13/70; H01R 13/7135; H01R 24/20; H01R 31/065; H02H 11/002; H02H 3/04; H02H 3/10; H02H 3/33; H02H 3/335; H02J 13/00026; H02J 13/0005; H02J 2310/14; H02M 1/32; H02M 5/2573; H05B 47/185; H05B 47/19;
(Continued)

(56) References Cited

U.S. PATENT DOCUMENTS

| | | | | |
|---|---|---|---|---|
| 5,793,125 A | * | 8/1998 | Tarng | G05B 19/042 361/170 |
| 2015/0036389 A1 | * | 2/2015 | Freeman | H02M 3/3374 363/16 |

(Continued)

OTHER PUBLICATIONS

Z. Deng "Smart Plug 2.0: A Solid-State Smart Plug Device Preventing Fire and Shock Hazards" IEEE, 2022, Transactions on Power Electronics, vol. 38, No. 3, pp. 3140-3151, https://ieeexplore.ieee.org/stamp/stamp.jsp?tp=&arnumber=9965771 (Year: 2022).*

*Primary Examiner* — Jared Fureman
*Assistant Examiner* — Nicolas Bellido
(74) *Attorney, Agent, or Firm* — Panley Erickson & Swanson (57) ABSTRACT

A wireless-controlled smart plug device and methods of use and operation, using a solid state switch to provide electrical power from an outlet to a load, and provide protection against overload, short circuit, ground, arc, or voltage surge faults. The switch includes a bidirectional semiconductor switch with two back-to-back connected transistors, such as silicon power MOSFETs, silicon insulated-gate bipolar transistors (IGBTs), silicon carbide (SiC) transistors, or gallium nitride (GaN) transistors, each configured to control the current flow from the electrical receptacle to the external electrical load.

23 Claims, 10 Drawing Sheets

(58) Field of Classification Search
CPC ....... Y02B 90/20; Y04S 20/00; Y04S 20/242; Y04S 40/126
See application file for complete search history.

(56) References Cited

U.S. PATENT DOCUMENTS

| | | | |
|---|---|---|---|
| 2015/0220101 A1* | 8/2015 | Aisa | G05F 3/04 307/31 |
| 2015/0222120 A1* | 8/2015 | Aisa | H02J 3/14 307/31 |
| 2016/0305992 A1* | 10/2016 | Yeo | G01R 22/063 |
| 2017/0033602 A1* | 2/2017 | Zhang | H02J 13/00004 |
| 2020/0153272 A1* | 5/2020 | Somma | H02J 4/00 |

* cited by examiner

SOLID STATE PROTECTIVE SMART PLUG DEVICE

CROSS REFERENCE TO RELATED APPLICATION

This application claims the benefit of U.S. Provisional Patent Application, Ser. No. 63/057,107, filed on 27 Jul. 2020. The provisional application is hereby incorporated by reference herein in its entirety and is made a part hereof, including but not limited to those portions which specifically appear hereinafter.

STATEMENT REGARDING FEDERALLY SPONSORED RESEARCH

This invention was made with government support under DE-AR0000890 awarded by ARPA-E/United States Department of Energy (DOE). The government has certain rights in the invention.

FIELD OF THE INVENTION

The present invention relates to a smart plug device for controlling electrical power from an outlet to a load via wireless communication, and more particularly, to a smart plug device that also provides protection against overload, short circuit, ground, arc, and voltage surge faults.

BACKGROUND OF THE INVENTION

A smart plug device connects or disconnects an electrical load from a power outlet (e.g. 110 VAC/10 A), with the 'smartness' based on control signals received from over a network (e.g., via WiFi). Exemplary existing smart plug devices include those described in, for example, U.S. Pat. No. 5,793,125 and U.S. Application Publication 2016/0305992, herein incorporated by reference as to components for operation. Smart plugs provide an easy and generally affordable way to upgrade ordinary appliances, lighting, and any other electronics into smart home devices that consumers can control from their smartphone or using a preset program. The smart plug market has been fast growing, with dozens of manufacturers around the world offering these types of products. Smart plugs offer a cost-effective way to automate homes, restaurants, hotels, and other businesses, and become a fun gadget for many tech savvy consumers. Additionally, they could easily enable the demand response concept, so utility companies can directly control some of the non-time-critical home appliances (e.g., washer/dryers, refrigerators, water heaters) depending on the real-time power demand and supply. Demand response is generally considered an effective and easy-to-implement approach to reduce fossil fuel consumption and carbon emission.

The smart plug products on the market today generally use an electromechanical relay to connect or disconnect a load from a power outlet. However, these devices generally do not offer any protection against abnormal circuit conditions such as overload, short circuit, ground, or arc faults occurred in the plugged-in circuit (power cord and load). Instead, they rely on the upstream circuit breaker or combination type circuit interrupter in the power main panel box to protect against these faults. This is because the electromechanical relay in the smart plug is not capable of interrupting a large fault current. Tens of milliseconds will pass before the upstream circuit breaker can disconnect the power to the faulty branch, during which time the smart plug itself, the load appliance, and the house wiring system must endure a very stressful fault current (typically 10-30 times of the nominal current rating), a scenario both dangerous and detrimental to the property and occupant. When the upstream circuit breaker eventually trips in responding to a fault, all other non-fault outlets on the same branch circuit would lose power, resulting in an annoying power outage in residential homes and a major disturbance and loss of productivity in large offices. It would be highly advantageous to isolate the fault where it occurs without causing power loss in other power outlets.

Furthermore, power cords plugged into wall outlets are subject to degradation of both insulation and metal wires over time due to mechanical stress and fatigue, a more serious condition than typical for fixed wirings. A common example is a repeatedly overstretched power cord for a laptop computer. This can result in at least one of two scenarios: breakdown of wire insulation and partial or complete disconnection of strand wires. A bad insulation between line and neutral or line and ground can cause short circuit faults, but even more critically grounding faults (line to ground) or parallel arcing faults (line to neutral) which are not protected by most upstream circuit breakers due to their low fault current levels in older houses. A grounding fault can cause dangerous shock hazards while an arc fault is a major cause for fire hazards. A partial disconnection of strand wires can cause high resistance and overheating, and thus fire hazards. A complete disconnection of strand wires can cause series arcing and fire hazards. Considering the large number of power cords being used worldwide, the potential benefit of addressing these safety concerns would be highly impactful. Yet none of the existing smart plugs on the market offer any protection against these fire or shock hazards.

Thus there is a continuing need for improvements, such as safety improvements, to smart plug devices.

SUMMARY OF THE INVENTION

The invention provides a smart plug device which provides protection against overload, short circuit, ground, arc, and/or voltage surge faults, in addition to controlling electrical power from an outlet to a load via wireless communication. Advantages of the invention can include all-in-one protection against shock or fire hazards, faster response to faults, lower overcurrent stress on wires and loads, and/or easier isolation and identification of local faults.

The invention includes a wireless-controlled smart plug device using solid state switches to provide electrical power from an outlet to a load, which protects against overload, short circuit, ground, arc, or voltage surge faults, and accommodates normal inrush current operations. The invention provides various embodiments which may be designed to include all or a subset of the mentioned protective functions. This invention may be designed with various types of silicon or wide bandgap (WBG) semiconductor switches, such as silicon power MOSFETs being preferred for voltage ratings under 240 volts.

The invention includes a protective smart plug including an electrical plug configured to connect to an electrical receptacle, and an electrical socket accommodating an electrical plug of an external electrical load. A bidirectional semiconductor switch controls a current flow from the electrical plug to the electrical socket. A wireless communication module is configured to receive and/or transmit operation instructions for the switch. A current sensor measures a load current and is configured to detect an overcurrent condition. A ground current sensor is configured to detect a ground fault condition. A current rate-of-change (di/dt) sensor is configured to detect an arcing condition. A gate driver circuit controls the bidirectional semiconductor switch as a function of the overcurrent or the arcing condition.

In embodiments of this invention, the bidirectional semiconductor switch comprises two back-to-back connected transistors. Exemplary transistors include silicon power MOSFETs, silicon insulated-gate bipolar transistors (IGBTs), silicon carbide (SiC) transistors, gallium nitride (GaN) transistors, and combinations thereof, each configured to control the current flow from the electrical receptacle to the external electrical load.

Embodiments of this invention provide a protective smart plug including a bidirectional semiconductor switch configured to interrupt a current flow from the electrical plug to the electrical socket, a wireless communication module configured to receive and/or transmit operation instructions for the switch, at least one sensor configured to detect a fault condition, a gate driver circuit to control the bidirectional semiconductor switch as a function of a detected fault condition, and a microcontroller connected to the wireless communication module, the at least one sensor, and the gate driver circuit, the microcontroller configured to control the gate driver circuit and a general operation of the protective smart plug.

In embodiments of this invention, the at least one sensor includes an overcurrent sensor configured to sense an overcurrent condition. The overcurrent sensor can be combined with a short circuit fault analog detection circuit configured to process an overcurrent sensor signal and generate a short circuit fault control signal to the microcontroller.

In embodiments of this invention, the at least one sensor includes a current rate-of-change sensor configured to sense load current discontinuity. The current rate-of-change sensor can be combined with an arc fault analog detection circuit configured to process a current rate-of-change sensor signal and generate an arc fault signal to the microcontroller.

In embodiments of this invention, the at least one sensor includes a ground leakage current sensor configured to sense ground leakage current. The ground leakage current sensor can be combined with a ground fault analog detection circuit configured to process a ground leakage current sensor signal and generate a ground fault control signal to the microcontroller.

In embodiments of this invention, the at least one sensor includes a voltage sensor configured to sense a line voltage and send signals to the microcontroller for power usage measurement and detection of overvoltage conditions.

The protective smart plug can include one or more of the following: a wireless communication module for receiving and transmitting data; a microcontroller for controlling operation of the smart plug based on wireless commands and a plurality of sensor signals, said microcontroller being programmed with control algorithms; a bidirectional semiconductor switch such as two back-to-back connected silicon power MOSFETs to control the current flow from the electrical receptacle to the external electrical load; a gate driver circuit to control the semiconductor switch; at least one current sensor to measure the load current and to detect overcurrent conditions; an analog control circuit to process the current sensor signal and generate a fast overcurrent control signal; a combined analog and digital controller to combine the analog control signal from the analog control circuit and a digital command signal from the microcontroller to generate a control signal to control the gate driver circuit; at least one ground leakage current sensor to sense ground leakage current; a ground fault analog detection circuit to process the ground leakage current sensor signal and generate a ground fault control signal to the microcontroller; at least one current rate-of-change (di/dt) sensor to sense arc faults; an arc fault analog sensing circuit to process the di/dt sensor signal and generate control signals to the microcontroller; a voltage sensor to sense the line voltage to send to the microcontroller for power usage measurement and detection of overvoltage conditions; a voltage surge protection circuit to suppress voltage surges between the power lines; at least one AC/DC power supply to provide isolated or non-isolated DC power to the circuits and sensors from the AC power lines; and combinations thereof. A manual push button can be included to send a control signal to the microcontroller to turn on and off the smart plug. An indicator can be included to receive commands from the microcontroller and indicate the operating status of the smart plug. And the components are generally enclosed in a housing, which optionally and desirably can dissipate heat internally generated by the smart plug.

The invention further includes a method for controlling electrical power from an outlet to a load through a protective smart plug. The method includes: sensing a plurality of power related operational parameters with a plurality of sensors within the protective smart plug; transmitting data comprising the parameters to a controller of the protective smart plug; and the controller operating a bidirectional semiconductor switch within the protective smart plug to control current flow from the outlet to the load.

In embodiments of this invention, the method includes: sensing a plurality of power related operational parameters from a plurality of sensors, transmitting data of the parameters to at least one controller, generating commands based on data transmitted to the controller by programed algorithms, and executing the commands sent by the controller through a bidirectional semiconductor. The controller controls the current flow from the outlet to the load. The bidirectional semiconductor can be made of two back-to-back connected silicon power MOSFETs to control the current flow from the electrical receptacle to the external electrical load and all other mentioned components. Other alternative embodiments include the bidirectional semiconductor made of two back-to-back connected silicon IGBTs or two back-to-back connected silicon carbide (SiC) transistors or two back-to-back connected gallium nitride (GaN) transistors. The bidirectional semiconductor can be controlled by a gate driver circuit. A combination of an analog control and a digital control can be used for controlling the bidirectional semiconductor. The sensors for sensing the power related operational parameters include current sensors and voltage sensors. The current sensors can further include a ground leakage current sensor and/or a current rate-of-change (di/dt) sensor. The voltage sensors can further include a line voltage sensing circuit for overvoltage or undervoltage protection and a voltage surge protection circuit to provide surge protection.

Other objects and advantages will be apparent to those skilled in the art from the following detailed description taken in conjunction with the appended claims and drawings.

DETAILED DESCRIPTION OF THE INVENTION

The invention includes and provides a wireless-controlled smart plug device and methods of using solid state switches to provide electrical power from an outlet to a load, and provide protection against overload, short circuit, ground, arc, or voltage surge faults. Embodiments of the invention can be further understood in the following detailed descriptions.

Figure 1:
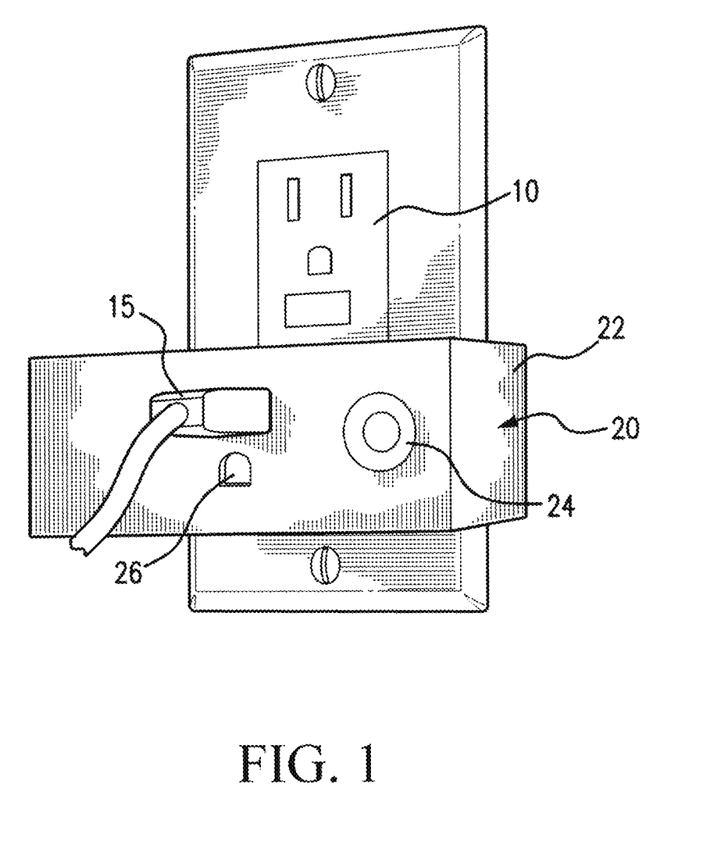
FIG. 1 illustrates an exemplary smart plug device, according to one embodiment of this invention.

FIG. 1 shows an exemplary smart plug device (or "smart plug") 20 according to one embodiment of the invention. The smart plug 20 includes a housing 22, with an optional manual on/off button 24. The smart plug 20 include the necessary plug elements to connect to an electrical receptacle, such as illustrated wall outlet 10, and includes an electrical socket 26 for receiving an electrical plug 15 of an external electrical load (e.g., a lamp, etc.). Internal components, e.g. circuitry, are discussed below. The plug, housing, manual button, etc., can vary in size, shape, placement and/or configuration, depending on need, but desirably essentially offering the same function of wireless-controlled turn-on and turn-off of electrical power.

Figure 2:
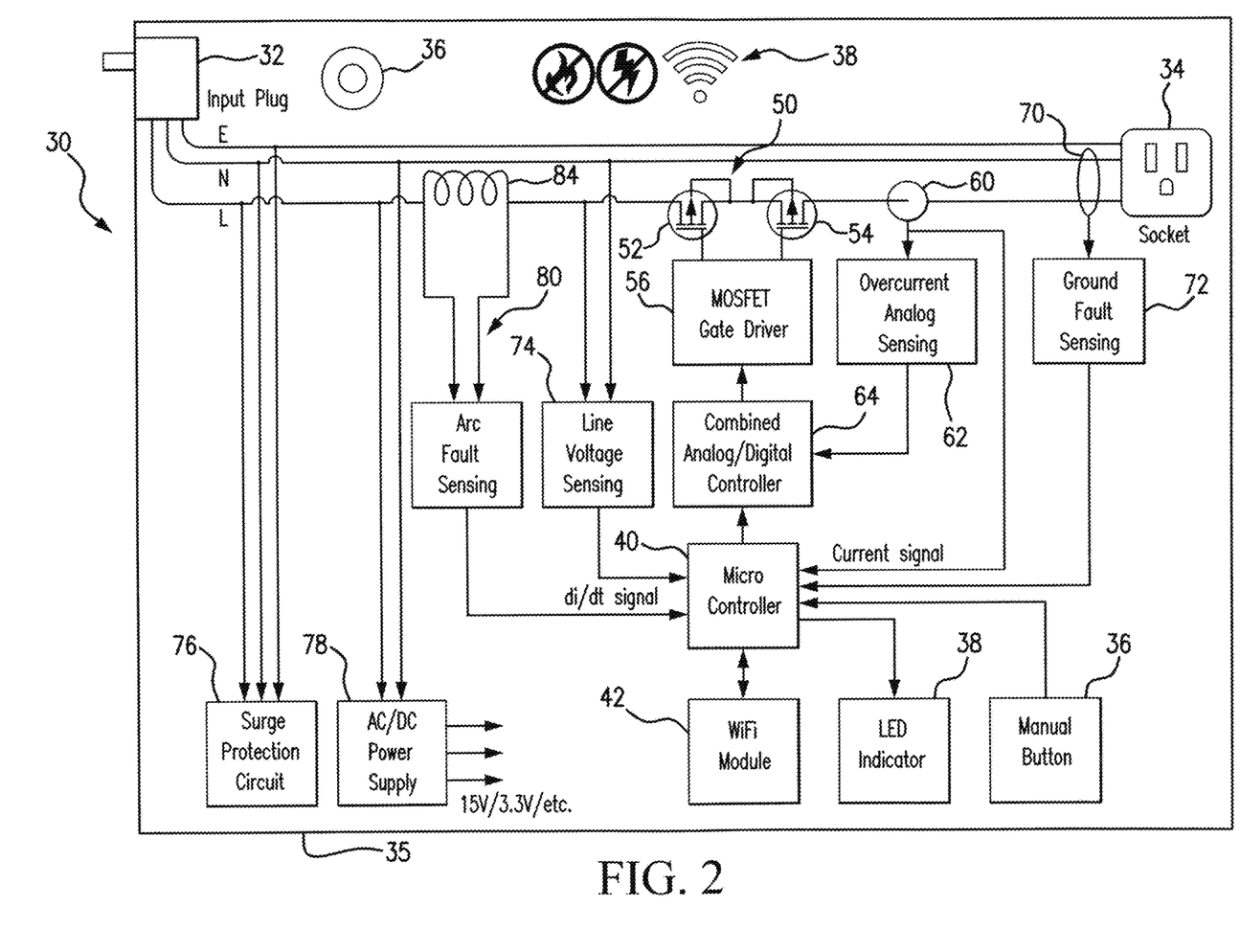
FIG. 2 is block diagram of solid state protective smart plug according to one embodiment of this invention.

FIG. 2 representatively illustrates a block diagram of a solid state protective smart plug 30 according to an embodiment of this invention. The smart plug 30 includes an electrical input plug 32 for connecting to an electrical receptacle (see FIG. 1), and an electrical socket 34 for receiving and accommodating an electrical plug of the external load (see FIG. 1). The smart plug 30 further includes wiring or equivalent connecting the input plug 32 to the socket 34, to transmit electricity therebetween. Illustrated is the line (L), the neutral (N), and the ground (E) paths.

The smart plug 30 includes a microcontroller 40, for general operation of the smart plug 30 and components described herein. The microcontroller 40 can be implemented in one or more controller modules, and includes a processor and operation algorithms for fully or partially implementing the smart plug operation and operational features described herein. The microcontroller 40 is in combination with a wireless communication module 42 for receiving and transmitting data, such as an on or off instruction, schedule, or status inquiry from a networked device (e.g., a smartphone). The module 42 can include or be in combination with the general operation components for operating the plug 30, such as the base on-off switching controls and components, such as are available in current devices. The microcontroller is further in operational combination with a manual button 36 and an LED indicator, such as for indicating an operation status (e.g., on, off, set-up, or fault interruption), for example, by using different color light or flashing patterns.

As shown in FIG. 2, embodiments of the invention incorporate a switch 50, generally located at least in the line path (L), to control the electricity transfer, and interrupt the electricity path upon a fault determination. The switch of this invention is desirably a semiconductor switch, and more desirably a bidirectional semiconductor switch. As illustrated in FIG. 2, the switch 50 includes two, back-to-back connected semiconductor transistors 52 and 54. As illustrated, the two back-to-back connected transistors 52 and 54 are each a silicon power MOSFET collectively used to control the current flow from the electrical receptable to the electrical load. Further examples of transistor-based switches useful in this invention include silicon insulated-gate bipolar transistors (IGBTs), silicon carbide (SiC) transistors, gallium nitride (GaN) transistors, and combinations thereof, each configured to control the current flow from the electrical receptacle to the external electrical load. A gate driver circuit 56 controls the semiconductor switch. The invention incorporates sensors for operation and determining faults or other conditions. Embodiments of the invention include at least one current sensor 60 to measure the load current and to detect overcurrent conditions. FIG. 2 shows an analog control circuit 62 to process the current sensor 60 signal and generate a fast overcurrent control signal. An analog and digital control circuit 64 is included to implement the analog control circuit 62 with an otherwise digital microcontroller 2. The analog and digital control circuit 64 receives and combines, or otherwise integrates, the analog control signal from the analog control circuit 62 and a digital control signal from the microcontroller 40 to generate an operational control signal to control the gate driver circuit 56 from both the analog and digital signal sources.

FIG. 2 further shows at least one ground leakage current sensor 70 in combination with the microcontroller 40, to sense ground leakage current. A ground fault analog detection circuit 72 is included to process the ground leakage current sensor 70 signal and generate a ground fault control signal for the microcontroller 40. A voltage sensor 74 is connected to the load and neutral lines to sense the line voltage to send signals to the microcontroller 40 for power usage measurement and detection of overvoltage conditions. A voltage surge protection circuit 76 can further be included to suppress voltage surges between the power lines.

Figure 3:
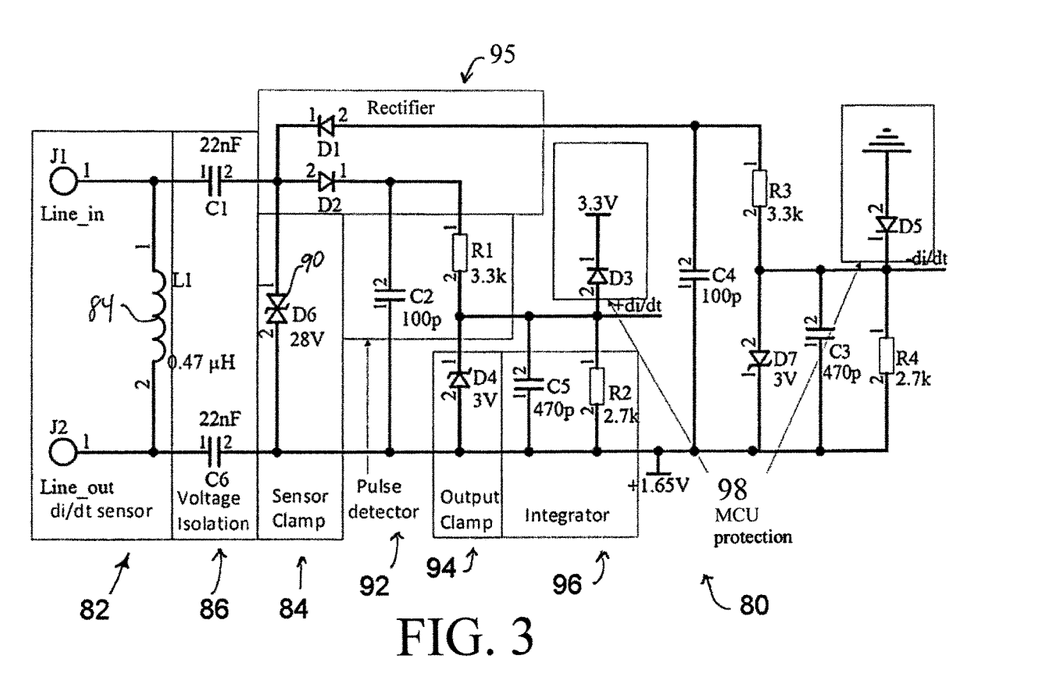
FIG. 3 illustrates an arc fault analog detection circuit, according to one embodiment of this invention

Embodiments of this invention further include an arc fault sensor or sensing circuit 80 to send arc fault detections to the microcontroller 40. FIG. 3 shows an embodiment of an arc fault analog detection circuit 80 according to one embodiment of this invention. The purpose of the arc fault analog detection circuit 80 is to detect load current discontinuity events (e.g., positive or negative di/dt pulses) as an indication of series arc faults. As shown in FIGS. 2 and 3, the arc fault analog detection circuit 80 includes a current rate-of-change (di/dt) sensor 82, including inductor 84 connected to the load line (L). The circuit 80 further includes a voltage isolation circuit 86, with parallel capacitors C1 and C6, and a sensor clamp 88 with a bidirectional diode 90. The circuit further includes a di/dt pulse detector 92, an output clamp 94, rectifier 95, integrator 96, and microcontroller (MCU) protection(s) 98, each formed of resistors (R), diodes (D), and/or capacitors (C) as illustrated. The arc sensing circuit can be embodied as needed, such as integrated with other circuits (e.g., the overcurrent analog sensor 62) of the device. Capacitors C1, C2, and C6 form a voltage divider for high-frequency arc signals. The capacitance values are selected properly to ensure C2 has most of the voltage drop. The sensor clamp TVS diodes 90 protect the sensor circuit components against overvoltage stress. The arc detection circuit 80 detects both positive and negative di/dt pulses and forwards the detection to the microcontroller (MCU).

The solid state protective smart plug 30 further includes at least one AC/DC power supply 78 to provide isolated or non-isolated DC power to the components, e.g., circuits and sensors, as needed from the AC power lines. All components and circuits are enclosed within a housing 35, which includes the button 36 and an indicator 38 that receives commands from the microcontroller and indicate the operating status of the smart plug, such as, without limitation, a fault indicator, power indicator, and/or a Wi-Fi connection indicator. In embodiments of this invention, the current sensor can measure the load current and send measured data to a suitable indicator to act as a smart meter for monitoring power consumption.

Figure 4:
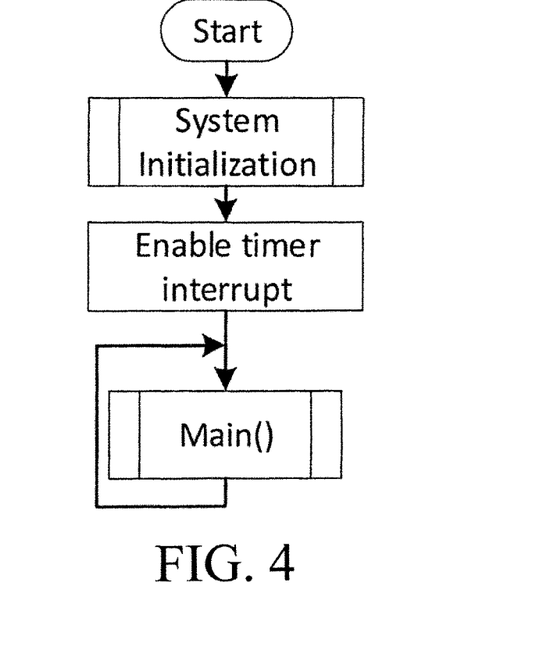
FIG. 4 illustrates a main control program flowchart according to one embodiment of this invention.

FIG. 4 illustrates a conceptual control program flowchart according to one embodiment of this invention. The microcontroller of the smart plug starts with a system initiation program after being plugged into a wall outlet and having received a manual or remote ON command. This is followed by enabling a timer interrupt program to check on load current condition and repeat this step in an infinite loop until exiting from the timer interrupt program.

Figure 5:
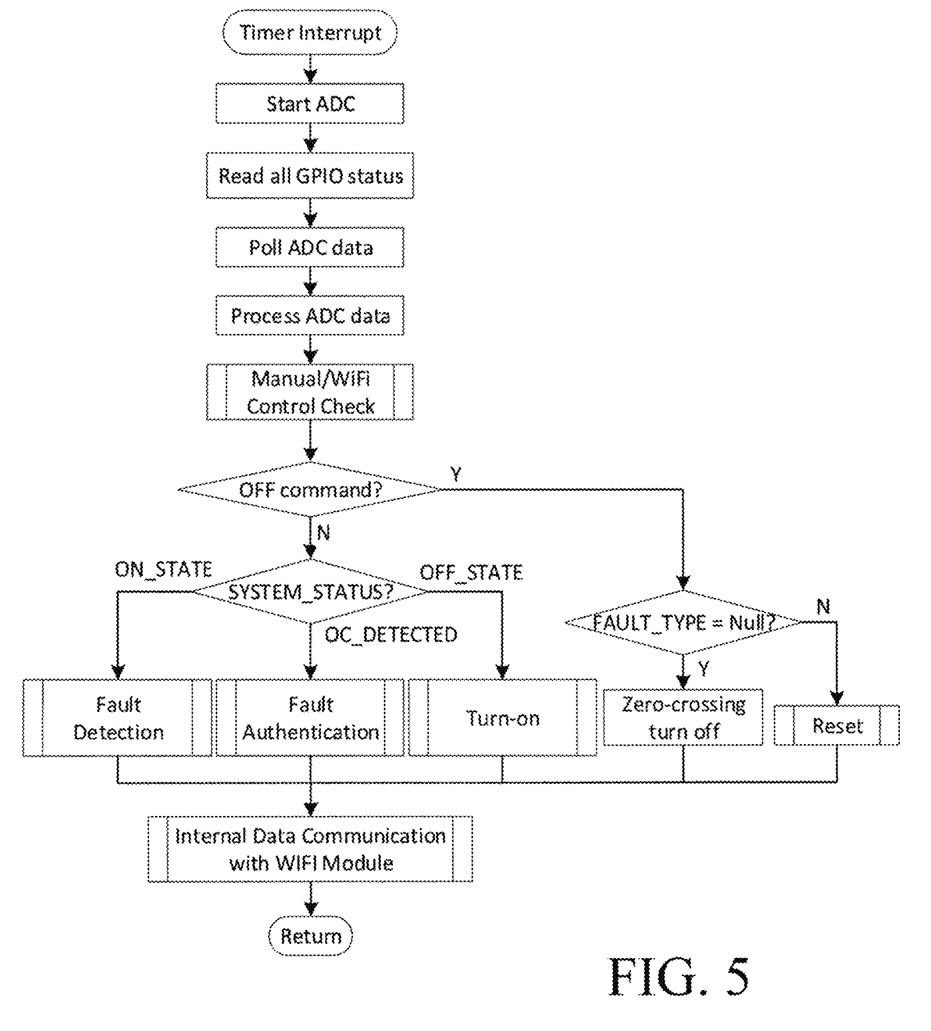
FIG. 5 illustrates a timer interrupt program flowchart according to one embodiment of this invention.

FIG. 5 illustrates a conceptual timer interrupt program flowchart according to embodiments of this invention. In this embodiment, the program is responsible for all normal switching and fault protection operations of the smart plug, and runs with a fixed cycle time ranging from tens to hundreds of microseconds. The program begins by activating all analog-to-digital (ADC) functions, reading all general purpose input/output (GPIO) status and polling all ADC and process data of the microcontroller. If it receives a WiFi or manual ON/OFF command at this point, it will respond accordingly and exit the program. Otherwise, it will continue to read the SYSTEM STATUS flag. If the SYSTEM STATUS flag indicates an OFF STATE (ON_STATE) from the previous interrupt cycle, the program will branch into a turn-on program. If the SYSTEM STATUS flag indicates an ON STATE (ON_STATE) from the previous interrupt cycle, the program will branch into a fault detection program. If the SYSTEM STATUS flag indicates an overcurrent fault being detected (OC_DETECTED) from the previous interrupt cycle, the program will branch into a short circuit fault authentication program. All the branch programs will return to an internal data communication program to communicate with the WiFi module before completing the current cycle of operation.

Figure 6:
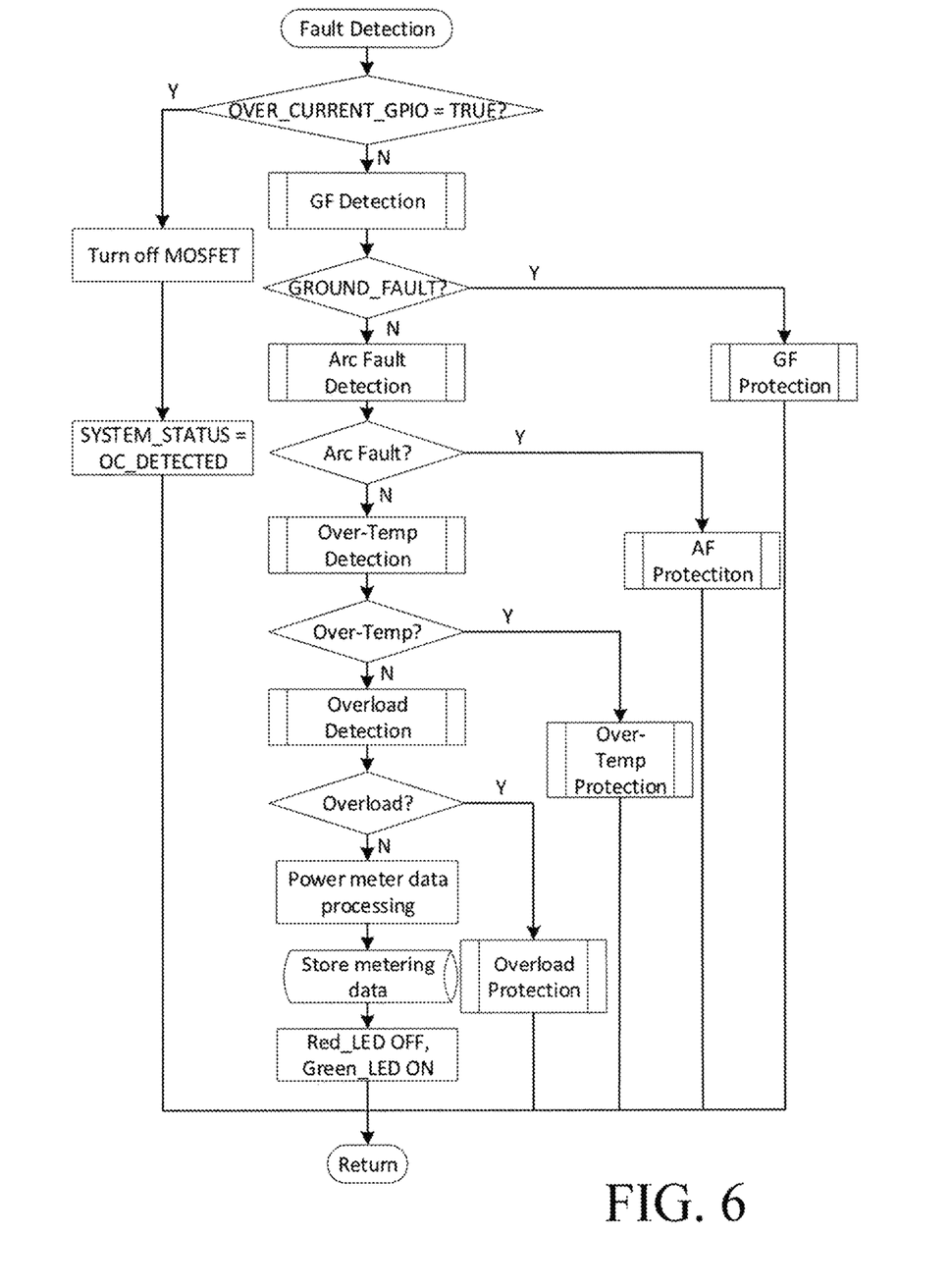
FIG. 6 illustrates a fault detection program flowchart according to one embodiment of this invention.

FIG. 6 illustrates a fault detection program flowchart according to embodiments of this invention. The program is responsible for sequentially detecting overcurrent, ground, arc, over-temperature, and/or overload faults. It will turn off the MOSFET immediately upon detecting an overcurrent condition such as twice the rated load current by the current sensor. Otherwise, it goes through other fault detection programs, and branch into a corresponding protection subroutine if a particular fault is detected. The program will store the power metering data and refresh the status indicator before completing the current cycle of operation if no fault is detected.

Figure 7:
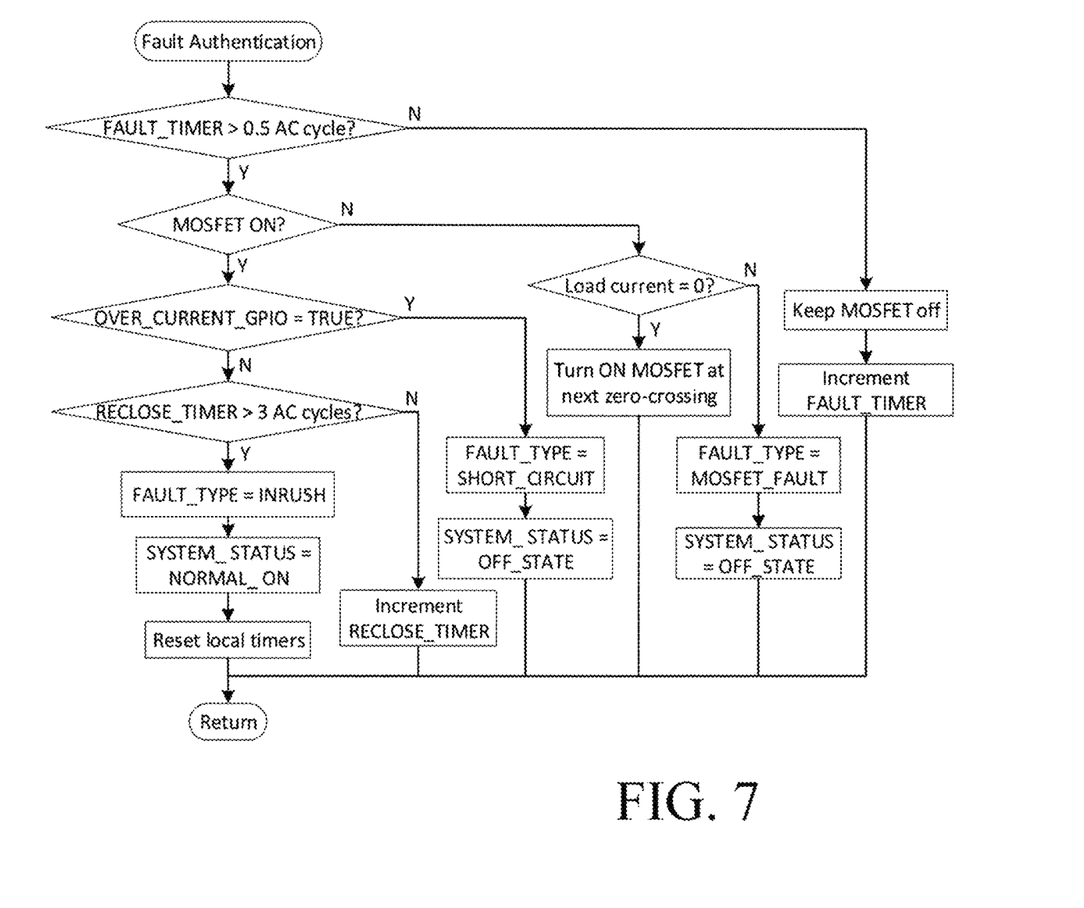
FIG. 7 illustrates a short circuit fault authentication program flowchart according to one embodiment of this invention.

FIG. 7 illustrates a conceptual short circuit fault authentication program flowchart of embodiments of this invention. The program is responsible for distinguishing between a true short circuit fault and a normal inrush current condition occurred during load startup or plug-in. The power MOSFET will be instantly turned off once an overcurrent condition is detected by the fault detection program, but will be turned back on ("reclosed") again after two AC cycles (roughly 33.3 milliseconds) by this program to authenticate the fault. If it is deemed a true short circuit fault, it will turn off permanently and exit the program. If it is deemed to be an inrush current case, the MOSFET will continue to conduct until exceeding the overcurrent threshold. This inrush current charging process may repeat a number of interrupt cycles until the MOSFET turns on permanently.

Figure 8:
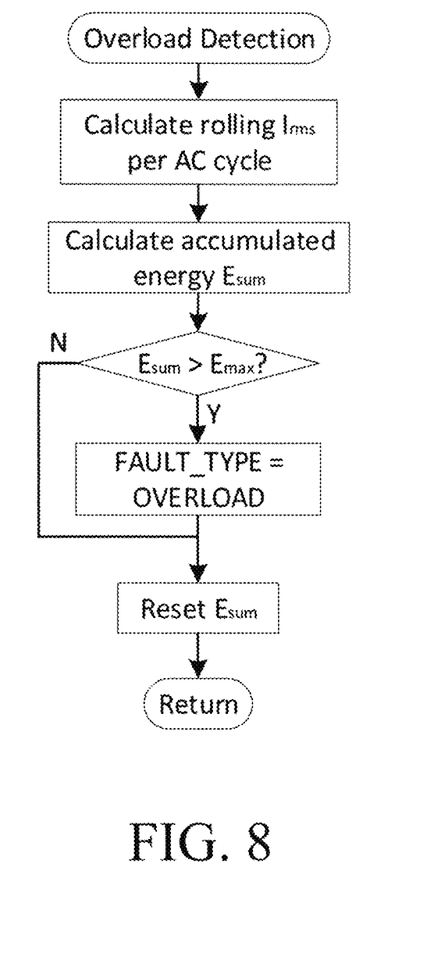
FIG. 8 illustrates an overload detection program flowchart according to one embodiment of this invention.

FIG. 8 illustrates a conceptual overload detection program flowchart of embodiments of this invention. The program is responsible for detecting a fault condition in which the accumulated transmitted energy over a preset rolling time window (e.g., one second) exceeds a certain preset value (e.g., 150% of the nominal power rating) while the instantaneous current is still below the preset overcurrent threshold. The program starts with calculating the root mean square (RMS) value of the output current over the past AC cycle, followed by calculating the accumulated transmitted energy over a preset rolling time window. If the accumulated energy exceeds a preset threshold, it is deemed to be an overload fault.

Figure 9:
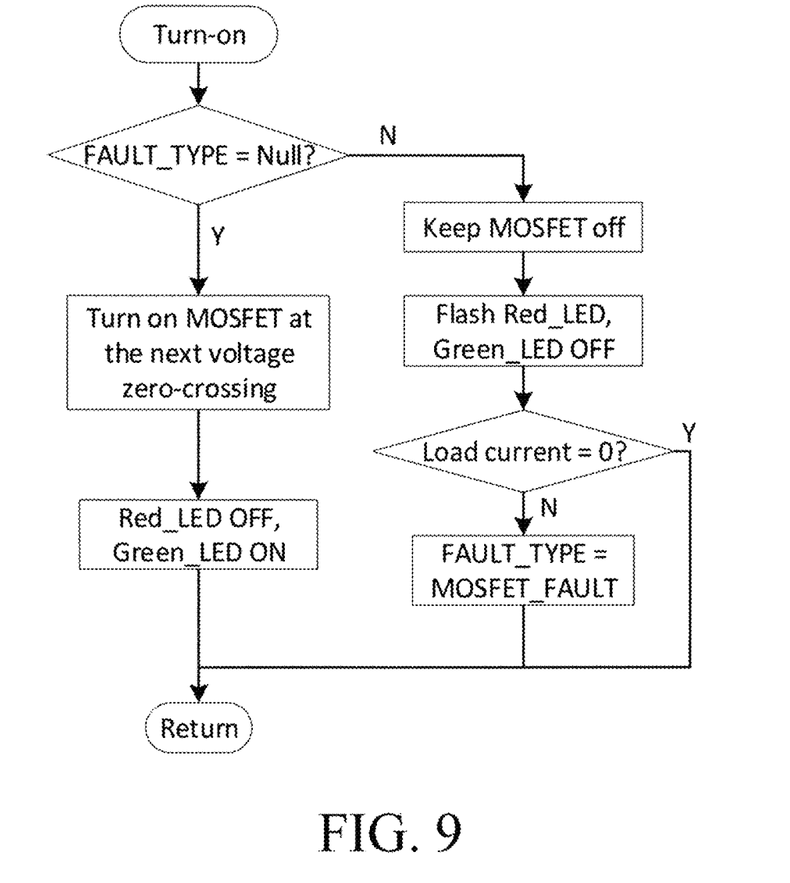
FIG. 9 illustrates a turn-on program flowchart according to one embodiment of this invention.
Figure 10:
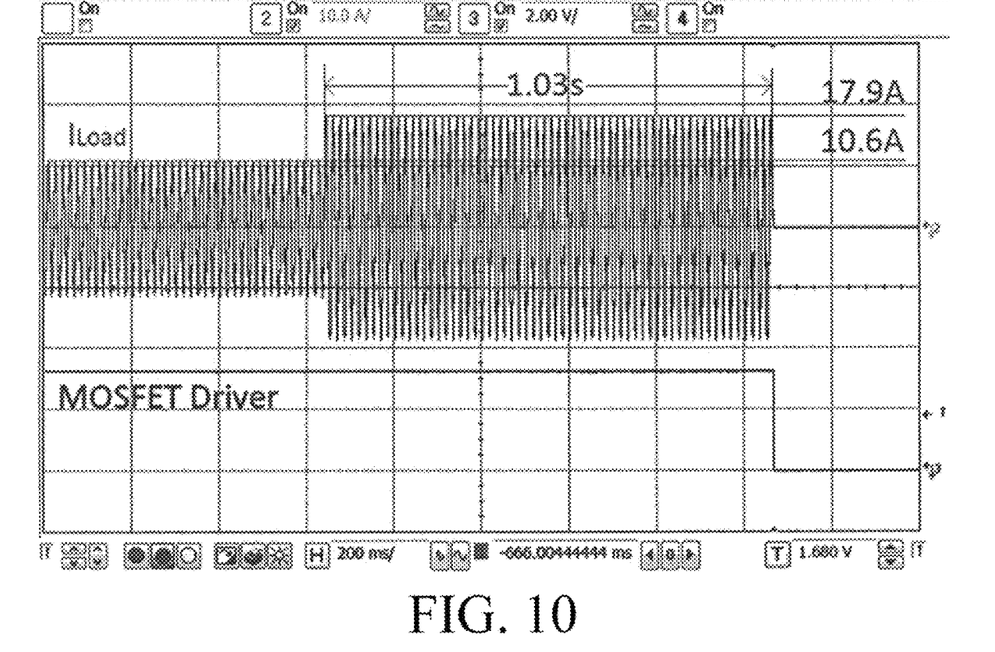
FIG. 10 illustrates the load current and MOSFET driver voltage waveforms under an overload fault condition according to one embodiment of this invention.

FIG. 9 illustrates a conceptual turn-on program flowchart of embodiments of this invention this invention. The program is responsible for turning on the power MOSFET from an off state at the next voltage zero-crossing if the FAULT TYPE flag indicates no fault detected during the previous interrupt cycle. Otherwise, the program will keep the MOSFET off.

Advantages of this invention include all-in-one protection, and capabilities of 1000 time faster response to short circuit faults, 5-10 times lower overcurrent stress on wires and loads, and easier isolation and identification of local faults.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

Examples

Figure 11:
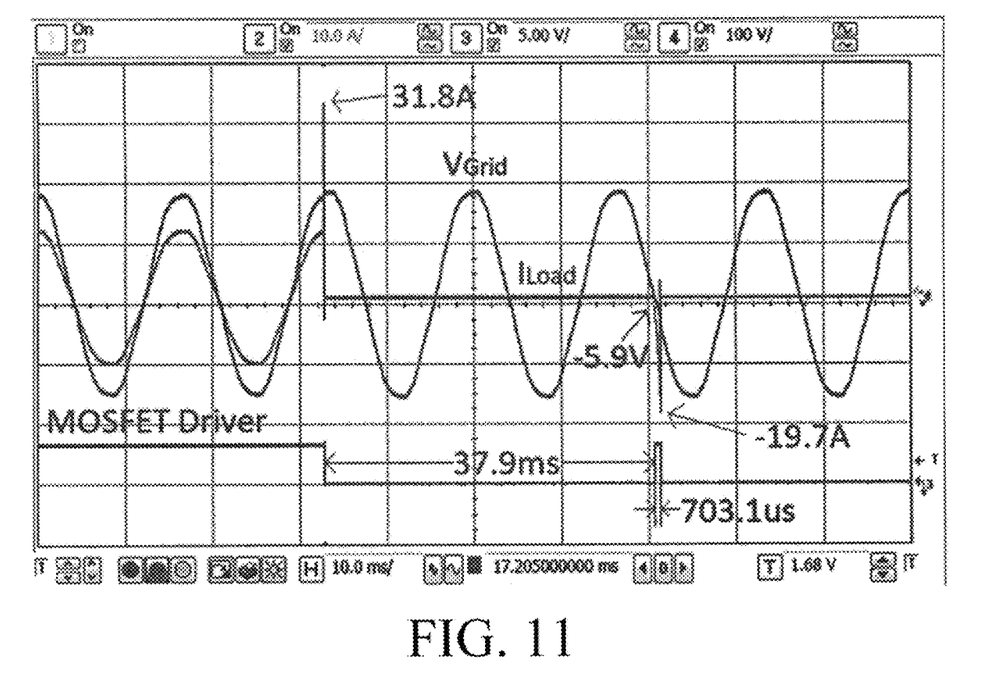
FIG. 11 illustrates exemplary load current, outlet voltage, and MOSFET driver voltage waveforms under a short circuit fault condition according to one embodiment of this invention.

FIG. 11 illustrates a measured load current and MOSFET driver voltage waveforms under an overload fault condition of one exemplary embodiment this invention. The overload threshold was set to be 8.5 A (RMS) in this particular case. If the continuously monitored and calculated RMS value of the load current exceeded the threshold for more than one second, the prototype turned off. It was observed that the smart plug prototype conducted a load current of 7.5 A (RMS) or 10.6 A (peak) initially, and then an additional load current of 5.2 A (RMS) was added. The overload condition lasted for 1.03 s and then the power MOSFETs turned off the total current at the next voltage zero-crossing point.

Figure 12:
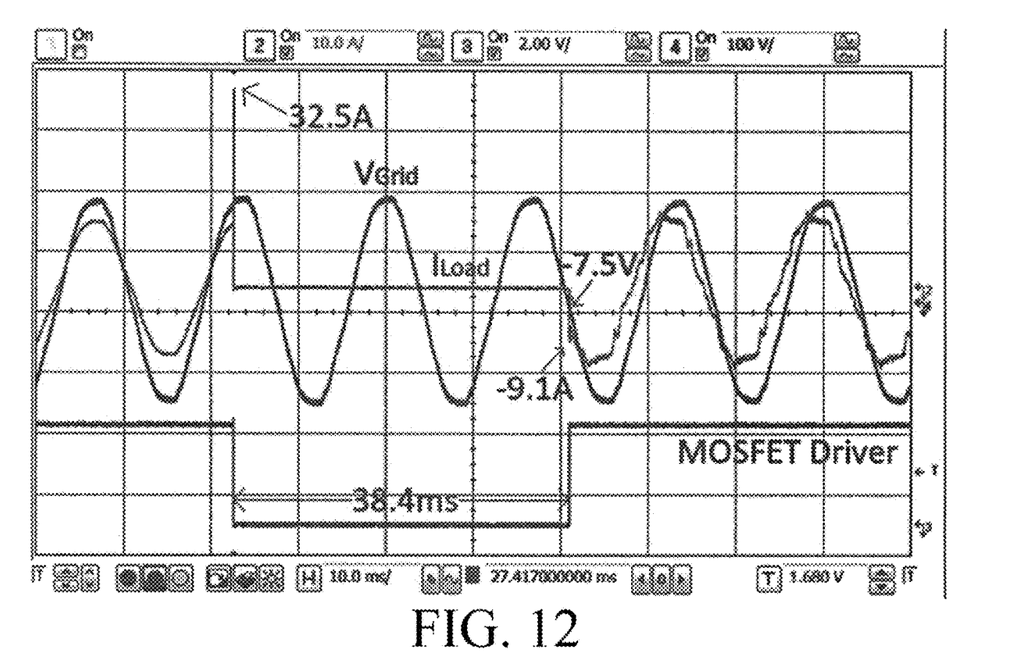
FIG. 12 illustrates exemplary load current, outlet voltage, and MOSFET driver voltage waveforms under an inrush current condition according to one embodiment of this invention.

FIG. 12 illustrates an exemplary measured load current, outlet voltage, and MOSFET driver voltage waveforms under a short circuit fault condition of this invention. At first, the smart plug prototype conducted a normal load current of 7.16 A. A peak short circuit fault current of 31.8 A was then induced and the MOSFETs turned off immediately. After two AC cycles, the MOSFETs turned back on at the first voltage zero-crossing point to check if the short circuit fault condition was sustained by the short circuit fault authentication program. After the fault current reaches −19.7 A again, the short circuit fault condition was authenticated, and the MOSFETs turned off again and remained off.

Figure 13:
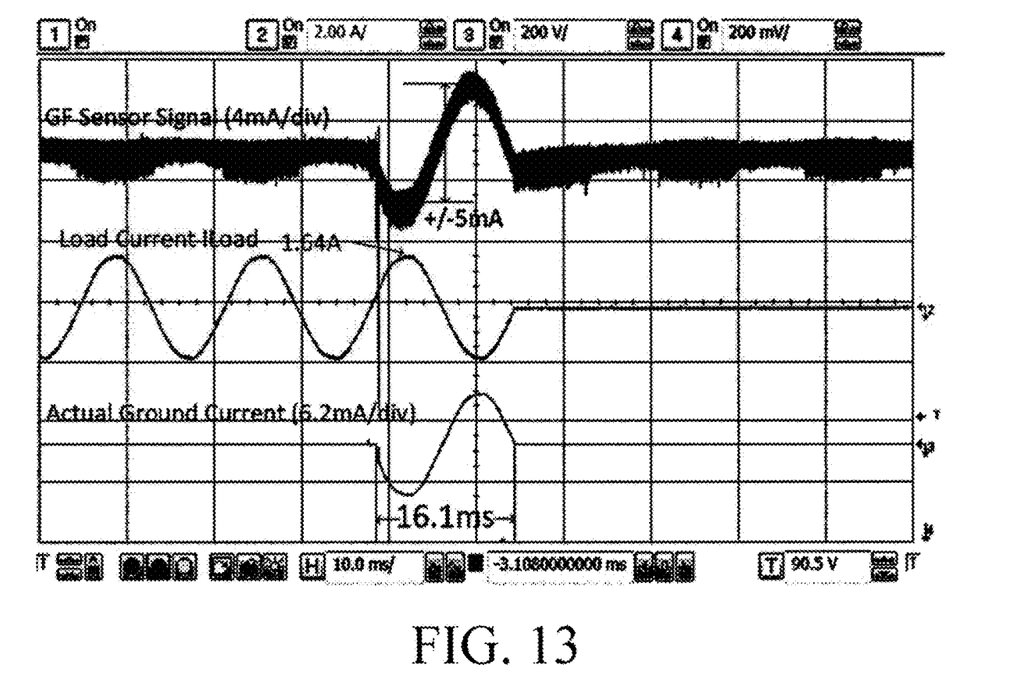
FIG. 13 illustrates exemplary ground leakage current sensor signal, load current, and actual ground current waveforms under a ground fault condition according to one embodiment of this invention.

FIG. 13 illustrates an exemplary measured load current, outlet voltage, and MOSFET driver voltage waveforms under an inrush current condition of this invention. At first, a normal load was connected and then an 80 µF capacitor was connected to the load side to induce an inrush current to emulate the startup situation of charging the input capacitor of a load. The sudden connection of the capacitor caused a peak inrush current of 32.5 A, and the smart plug prototype turned off the power MOSFETs within a few microseconds. When the smart plug next ran the short circuit fault authentication program, the MOSFETs turned on at the first zero-crossing point after two AC cycles. This time the capacitor was already charged, and did not induce a high inrush current. The smart plug prototype remained in the ON state. It was observed that the smart plug device could distinguish between a high inrush current and a true short circuit fault. FIG. 13 illustrates the measured ground leakage current sensor signal, load current, and actual ground current waveforms under a ground fault condition. A normal load current of 1.64 A (peak) was present when a resistor of 32.4 kΩ was purposely inserted between the line and ground wires to introduce a ground fault condition. The microcontroller turned off the power MOSFETs at the next current zero-crossing point upon receiving a ground fault current greater than 5 mA.

Thus the invention provides a smart plug device that can provide electrical power from an outlet to a load, and also provide protection against overload, short circuit, ground, arc, or voltage surge faults.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the future claims. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A protective smart plug, comprising:
an electrical input plug configured to be connected to an electrical receptacle;
an electrical socket configured to accommodate an electrical plug of an external electrical load;
a bidirectional semiconductor switch configured to interrupt a current flow from the electrical input plug to the electrical socket;
a wireless communication module configured to receive and/or transmit operation instructions for the bidirectional semiconductor switch;
at least one sensor configured to detect a fault condition;
a gate driver circuit to control the bidirectional semiconductor switch as a function of a detected fault condition;
a microcontroller connected to the wireless communication module, the at least one sensor, and the gate driver circuit, the microcontroller configured to control the gate driver circuit and a general operation of the protective smart plug; and
a combined analog and digital controller to combine an analog control signal of an analog control circuit and a digital command signal from the microcontroller to generate a control signal for the gate driver circuit.

2. The protective smart plug of claim 1, wherein the bidirectional semiconductor switch comprises two back-to-back connected transistors.

3. The protective smart plug of claim 2, wherein the two back-to-back connected transistors are selected from the group consisting of silicon power MOSFETs, silicon insulated-gate bipolar transistors (IGBTs), silicon carbide (SiC) transistors, gallium nitride (GaN) transistors, or combinations thereof, each configured to control the current flow from the electrical receptacle to the external electrical load.

4. The protective smart plug of claim 1, wherein the analog control circuit is configured to process a current sensor signal and generate a fast overcurrent control signal.

5. The protective smart plug of claim 1, wherein the at least one sensor comprises an overcurrent sensor configured to sense an overcurrent condition; and further comprising:
a short circuit fault analog detection circuit configured to process an overcurrent sensor signal and generate a short circuit fault control signal to the microcontroller.

6. The protective smart plug of claim 5, wherein the at least one sensor comprises a current rate-of-change sensor configured to sense a load current discontinuity; and further comprising:
an arc fault analog detection circuit configured to process a current rate-of-change sensor signal and generate an arc fault signal to the microcontroller.

7. The protective smart plug of claim 5, wherein the at least one sensor comprises a ground leakage current sensor configured to sense ground leakage current; and further comprising:
a ground fault analog detection circuit configured to process a ground leakage current sensor signal and generate a ground fault control signal to the microcontroller.

8. The protective smart plug of claim 1, wherein the at least one sensor comprises a current rate-of-change sensor configured to sense a load current discontinuity; and further comprising:
an arc fault analog detection circuit configured to process a current rate-of-change sensor signal and generate an arc fault signal to the microcontroller, wherein the arc fault sensor comprises an inductor circuit in combination with a load current through the protective smart plug.

9. The protective smart plug of claim 1, wherein the at least one sensor comprises a ground leakage current sensor configured to sense ground leakage current; and further comprising:
a ground fault analog detection circuit configured to process a ground leakage current sensor signal and generate a ground fault control signal to the microcontroller.

10. The protective smart plug of claim 1, wherein the at least one sensor comprises a voltage sensor configured to sense a line voltage and send signals to the microcontroller for power usage measurement and detection of overvoltage conditions.

11. The protective smart plug of claim 1, further comprising a voltage surge protection circuit configured to suppress voltage surges between power lines.

12. The protective smart plug of claim 1, further comprising a current sensor configured to measure a load current and send measured data to a display device, whereby the protective smart plug is a smart meter for monitoring power consumption.

13. A method for controlling electrical power from an outlet to a load through a protective smart plug, the method comprising:
sensing a plurality of power related operational parameters with a plurality of sensors within the protective smart plug;
transmitting data comprising the operational parameters to a controller of the protective smart plug;
the controller operating a bidirectional semiconductor switch within the protective smart plug to control current flow from the outlet to the load; and
an analog control circuit processing a current sensor signal and generating a fast overcurrent control signal, wherein the controller comprises a combined analog and digital controller to combine an analog control signal of the analog control circuit and a digital command signal to generate a control signal for a gate driver circuit.

14. The method of claim 13, wherein the bidirectional semiconductor switch comprises two back-to-back connected transistors.

15. The method of claim 14, wherein the two back-to-back connected transistors are selected from the group consisting of silicon power MOSFETs, silicon insulated-gate bipolar transistors (IGBTs), silicon carbide (SiC) transistors, gallium nitride (GaN) transistors, or combinations thereof, each configured to control the current flow from an electrical receptacle to the load.

16. The method of claim 13, further comprising executing controller operation using the gate driver circuit in control combination with the bidirectional semiconductor switch.

17. The method of claim 13, wherein the combined analog and digital controller receives the digital command signal from a microcontroller of the protective smart plug.

18. The method of claim 13, wherein the power related operational parameters comprise current rate of change and voltage.

19. A protective smart plug, comprising:
an electrical input plug configured to be connected to an electrical receptacle;
an electrical socket configured to accommodate an electrical plug of an external electrical load;
a bidirectional semiconductor switch configured to interrupt a current flow from the electrical input plug to the electrical socket;
a wireless communication module configured to receive and/or transmit operation instructions for the bidirectional semiconductor switch;
at least one sensor configured to detect a fault condition, wherein the at least one sensor comprises an overcurrent sensor configured to sense an overcurrent condition;
a gate driver circuit to control the bidirectional semiconductor switch as a function of a detected fault condition;
a microcontroller connected to the wireless communication module, the at least one sensor, and the gate driver circuit, the microcontroller configured to control the gate driver circuit and a general operation of the protective smart plug; and
a short circuit fault analog detection circuit configured to process an overcurrent sensor signal and generate a short circuit fault control signal to the microcontroller.

20. The protective smart plug of claim 19, wherein the at least one sensor comprises a current rate-of-change sensor configured to sense a load current discontinuity; and further comprising:
an arc fault analog detection circuit configured to process a current rate-of-change sensor signal and generate an arc fault signal to the microcontroller.

21. The protective smart plug of claim 19, wherein the at least one sensor comprises a ground leakage current sensor configured to sense ground leakage current; and further comprising:
a ground fault analog detection circuit configured to process a ground leakage current sensor signal and generate a ground fault control signal to the microcontroller.

22. A protective smart plug, comprising:
an electrical input plug configured to be connected to an electrical receptacle;
an electrical socket configured to accommodate an electrical plug of an external electrical load;
a bidirectional semiconductor switch configured to interrupt a current flow from the electrical input plug to the electrical socket;
a wireless communication module configured to receive and/or transmit operation instructions for the bidirectional semiconductor switch;
at least one sensor configured to detect a fault condition, wherein the at least one sensor comprises a current rate-of-change sensor configured to sense a load current discontinuity;
a gate driver circuit to control the bidirectional semiconductor switch as a function of a detected fault condition;
a microcontroller connected to the wireless communication module, the at least one sensor, and the gate driver circuit, the microcontroller configured to control the gate driver circuit and a general operation of the protective smart plug; and
an arc fault analog detection circuit configured to process a current rate-of-change sensor signal and generate an arc fault signal to the microcontroller, wherein the arc fault sensor comprises an inductor circuit in combination with a load current through the protective smart plug.

23. A protective smart plug, comprising:
- an electrical input plug configured to be connected to an electrical receptacle;
- an electrical socket configured to accommodate an electrical plug of an external electrical load;
- a bidirectional semiconductor switch configured to interrupt a current flow from the electrical input plug to the electrical socket;
- a wireless communication module configured to receive and/or transmit operation instructions for the bidirectional semiconductor switch;
- at least one sensor configured to detect a fault condition, wherein the at least one sensor comprises a ground leakage current sensor configured to sense ground leakage current;
- a gate driver circuit to control the bidirectional semiconductor switch as a function of a detected fault condition;
- a microcontroller connected to the wireless communication module, the at least one sensor, and the gate driver circuit, the microcontroller configured to control the gate driver circuit and a general operation of the protective smart plug; and
- a ground fault analog detection circuit configured to process a ground leakage current sensor signal and generate a ground fault control signal to the microcontroller.

\* \* \* \* \*